United States Patent
Bellows et al.

(10) Patent No.: US 8,539,750 B2
(45) Date of Patent: Sep. 24, 2013

(54) ENERGY RECOVERY AND STEAM SUPPLY FOR POWER AUGMENTATION IN A COMBINED CYCLE POWER GENERATION SYSTEM

(75) Inventors: James C. Bellows, Maitland, FL (US); Frederick W. Shoemaker, Longwood, FL (US)

(73) Assignee: Siemens Energy, Inc., Orlando, FL (US)

( * ) Notice: Subject to any disclaimer, the term of this patent is extended or adjusted under 35 U.S.C. 154(b) by 817 days.

(21) Appl. No.: 12/771,235

(22) Filed: Apr. 30, 2010

(65) Prior Publication Data

US 2011/0265444 A1 Nov. 3, 2011

(51) Int. Cl.
*F02C 3/30* (2006.01)
*F02C 6/00* (2006.01)

(52) U.S. Cl.
USPC ........ 60/39.55; 60/39.182; 60/775; 60/39.53; 60/670

(58) Field of Classification Search
USPC ................ 60/775, 39.182, 39.53, 39.55, 670; 122/7 R, 7 B
See application file for complete search history.

(56) References Cited

U.S. PATENT DOCUMENTS

| | | | | |
|---|---|---|---|---|
| 3,353,360 A | * | 11/1967 | Gorzegno | 60/39.182 |
| 3,693,347 A | * | 9/1972 | Kydd et al. | 60/775 |
| 4,969,324 A | | 11/1990 | Woodson | |
| 5,375,410 A | | 12/1994 | Briesch | |
| 5,628,183 A | | 5/1997 | Rice | |
| 5,842,345 A | * | 12/1998 | Scharpf | 60/649 |
| 5,906,095 A | | 5/1999 | Frutschi et al. | |
| 6,357,218 B1 | * | 3/2002 | Ranasinghe et al. | 60/775 |
| 6,378,285 B1 | * | 4/2002 | Blatter et al. | 60/775 |
| 6,446,440 B1 | | 9/2002 | Ranasinghe et al. | |

FOREIGN PATENT DOCUMENTS

EP 0789134 A2 1/1997

* cited by examiner

*Primary Examiner* — William H Rodriguez
*Assistant Examiner* — Steven Sutherland

(57) ABSTRACT

A power generation system (11) and method of operating such a system (11) including a steam turbine (14). In one embodiment a HRSG (20) includes an evaporator (127) coupled to receive condensate from the steam turbine (14), and a superheater (132) coupled to receive output from the evaporator (127). The HRSG (20) generates steam with thermal energy received from a combustion turbine (28). A flash tank (9) receives water heated in the HRSG (20), outputs a first portion of the water as steam, and outputs a second portion of the water as liquid. A flow line (134) passes steam (51) from the flash tank (9) to a combustion chamber (26) in the combustion turbine (28) to provide power augmentation.

18 Claims, 3 Drawing Sheets

ENERGY RECOVERY AND STEAM SUPPLY FOR POWER AUGMENTATION IN A COMBINED CYCLE POWER GENERATION SYSTEM

FIELD OF THE INVENTION

The present invention relates generally to power systems and, more particularly, to combined cycle power generation systems of the type incorporating both a Rankine cycle and a Brayton cycle. More specifically, the invention relates to systems and methods for improving both the power output and efficiency of such power generation systems.

BACKGROUND OF THE INVENTION

Combined cycle power plants have come into widespread use because they incorporate heat exchangers that can recover heat from the hot gas exhaust stream of a combustion engine. Conventionally the recovered heat is used to generate the working fluid of a steam turbine. This results in more efficient power generation than is achievable with only a combustion turbine or only a steam turbine. See, for example, U.S. Pat. No. 5,375,410 which is assigned to the assignee of the present invention and incorporated herein by reference.

Generally, combined cycle power generation systems include a first power source based on a combustion process and a second power source which operates on a Rankine cycle, i.e., a steam cycle. Conventionally the first power source is a gas turbine, wherein heat from hot exhaust gases of the combustion process are transferred to the working fluid in the Rankine cycle through a Heat Recovery Steam Generator (HRSG). Such systems can operate at overall plant efficiencies on the order of 55 percent or higher.

Combined cycle power generation systems are most efficient during steady state operations. However, at times of peak power demand there are often needs to rapidly increase power output. One method for doing so, commonly referred to as power augmentation, involves diversion of steam from the steam cycle, e.g., removal of superheated steam prior to output from a steam turbine, and feeding the steam directly into the combustion chamber of the gas turbine. When a combined cycle power plant operates in such a power augmentation mode, the steam removed from the Rankine cycle is at a pressure somewhat higher than the pressure of the compressed air at the input to the combustion chamber. Once the steam enters the chamber its temperature is substantially elevated as it mixes with the combustion gases. This results in substantial expansion such that power output from the steam via the gas turbine section is much greater than would be provided with the steam turbine.

However, diversion of the steam for power augmentation removes energy from the Rankine cycle during the same period in which efforts are undertaken to increase plant power output. Thus efforts to move the system into a higher level of steady state power output are impeded because the lost steam must be replaced by heating relatively cool make-up water. The amount of make-up water required can be 20 percent or more of the feedwater volume present in the Rankine cycle.

Energy losses associated with steam diversion and injection of make-up water are compounded when, as is often the situation, the make-up water is of insufficient purity. In a once-through design, to remove impurities steam bottles are commonly incorporated in one or more stages of the HRSG to effect moisture separation. Although the flow is normally controlled to create dry steam at the exit of the HRSG evaporator, by increasing the volume flow rate of the feedwater flowing from the boiler and through the evaporator, the steam remains moist as it exits the HRSG evaporator tubing. Steam bottles placed in-line with the tubing facilitate removal of the moisture and, along with the moisture, a substantial portion of the impurity component is also removed. This may effect removal of about 90 percent of the impurities but with further loss of energy present in the separated moisture.

In other HRSG designs, moisture separation is continuous in the steam drum, which always contains liquid.

BRIEF DESCRIPTION OF THE DRAWING

The invention is explained in the following description in view of the drawing wherein.

Like reference numbers are used to denote like features throughout the figures.

DETAILED DESCRIPTION OF THE INVENTION

Figure 1:
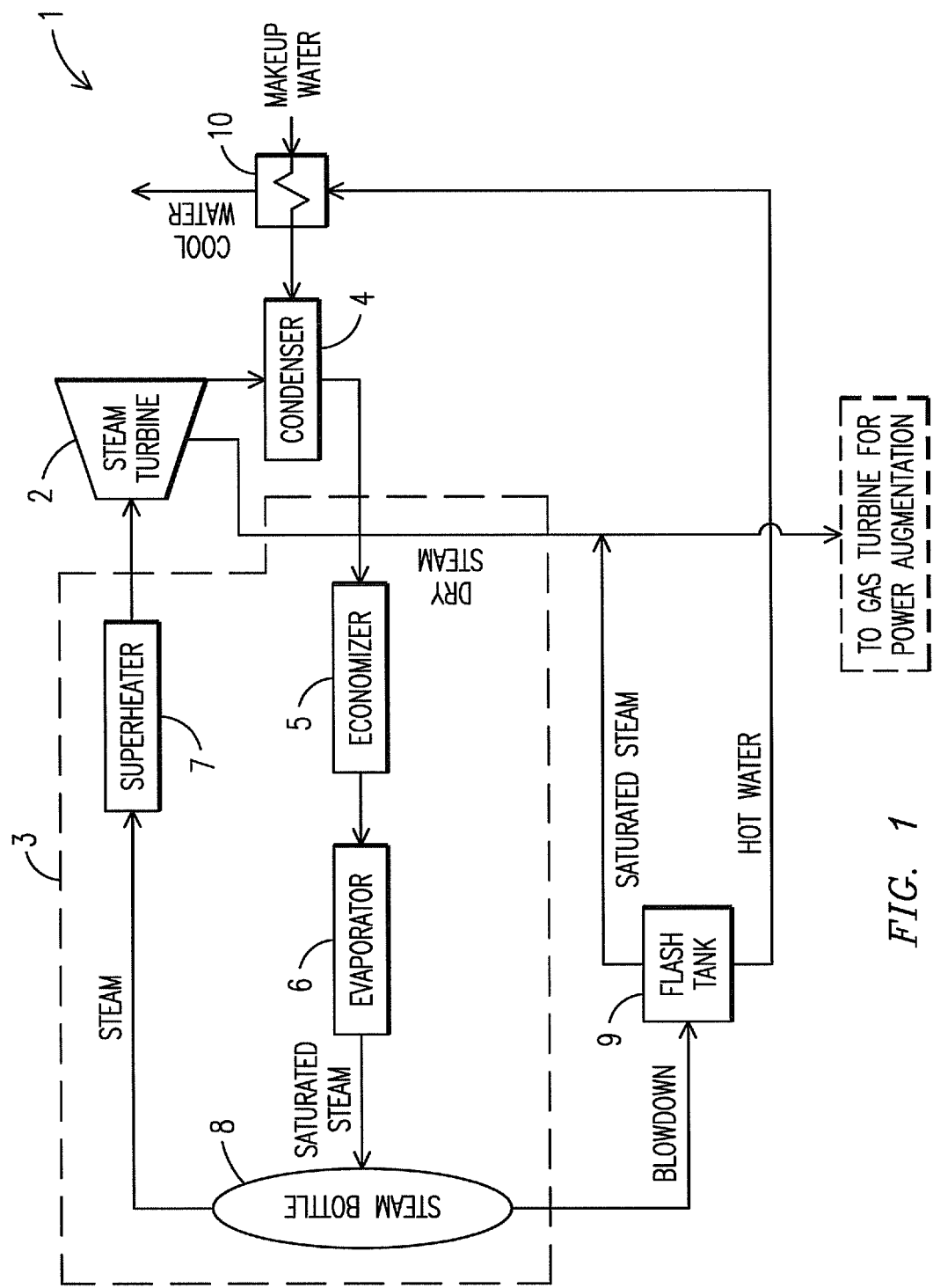
FIG. 1 is a simplified schematic diagram which illustrates the steam turbine system of a combined cycle power generation system according to an embodiment of the invention.
Figure 3:
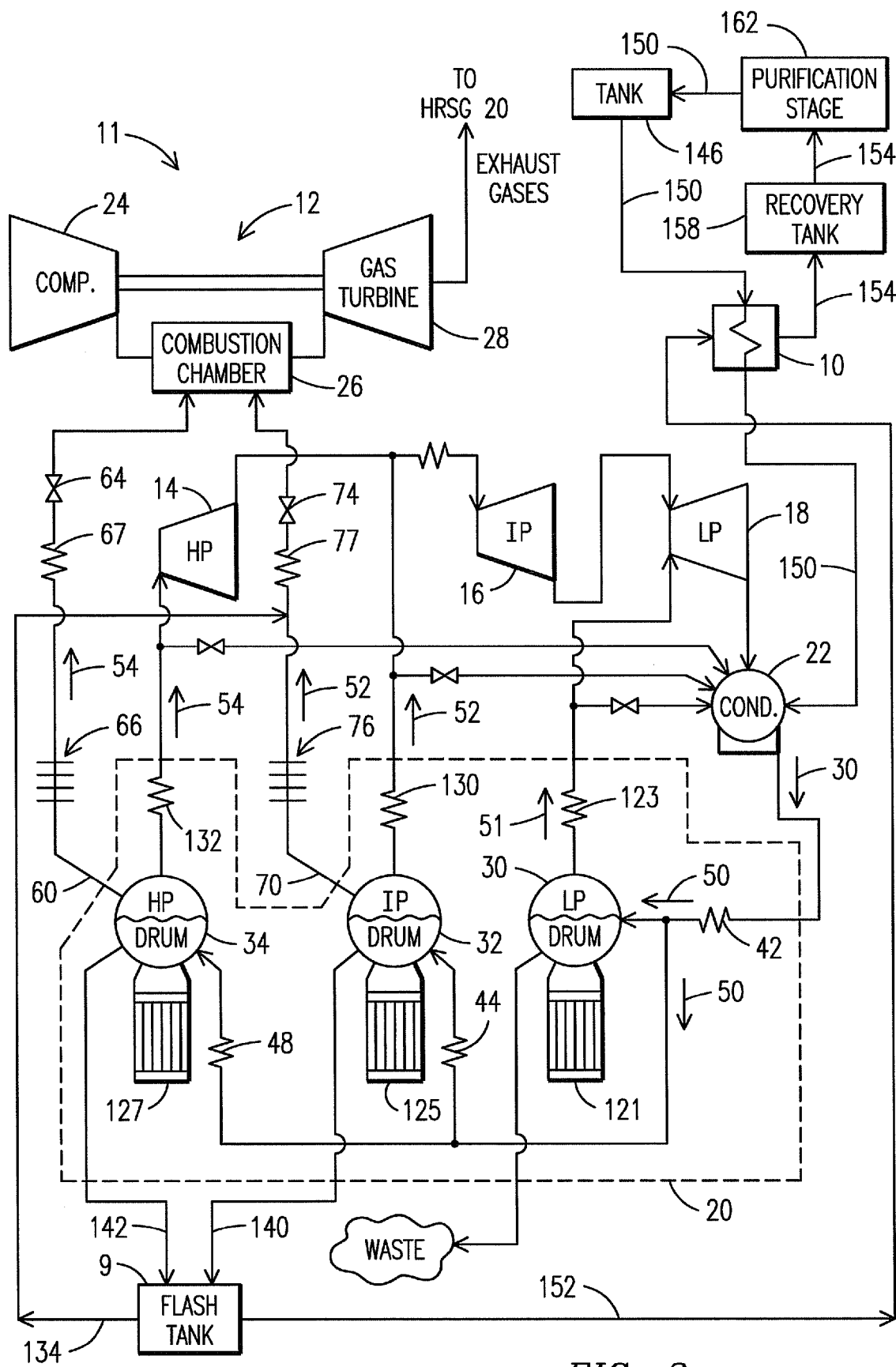
FIG. 3 illustrates a combined cycle power generation system according to still another embodiment of the invention.

With reference to FIG. 1, there is shown in simplified schematic form a steam turbine system 1 according to an embodiment of the invention. Although not illustrated, the annotation in FIG. 1 "TO GAS TURBINE FOR POWER AUGMENTATION", indicates that the system 1 is part of a combined cycle power generation system. An exemplary combined cycle system incorporating features of the invention is shown in FIG. 3.

The system 1 includes a steam turbine 2 which receives superheated steam from a once-through HRSG 3. Working fluid output from the turbine 2 is provided to a condenser 4 and then recycled into the HRSG 3. It is to be recognized that a HRSG design for a combined cycle system will normally have multiple stages but, for simplicity of illustration, the illustrated components of the HRSG 3 are an economizer 5, which is coupled to receive water from the condenser 4, an evaporator 6. which transitions the water into steam, a superheater 7, which converts saturated steam received from the evaporator into dry steam for injection into the steam turbine 2, a steam bottle 8, positioned in line between the evaporator 6 and the superheater 7, and a flash tank 9 coupled to receive water from the steam bottle.

The steam bottle 8 functions as a moisture separation stage prior to entry of steam into the superheater 7. In a once-through steam generator, the steam entering the steam bottle 8 is usually dry steam. However, to cause moisture separation, the flow to the evaporator 6 is increased to the point where the steam entering the steam bottle 8 is wet. Then in the moisture separation process a substantial portion of impurities present in the steam entering the bottle 8, e.g., introduced via make-up water, is entrained with the liquid fraction of the steam and carried from the bottle 8 to the flash tank 9 as blowdown. A feature of the invention is that the portion of the liquid from the steam bottle (e.g., about 20 percent) converted into steam in the flash tank 9 is used for power augmentation.

Figure 2:
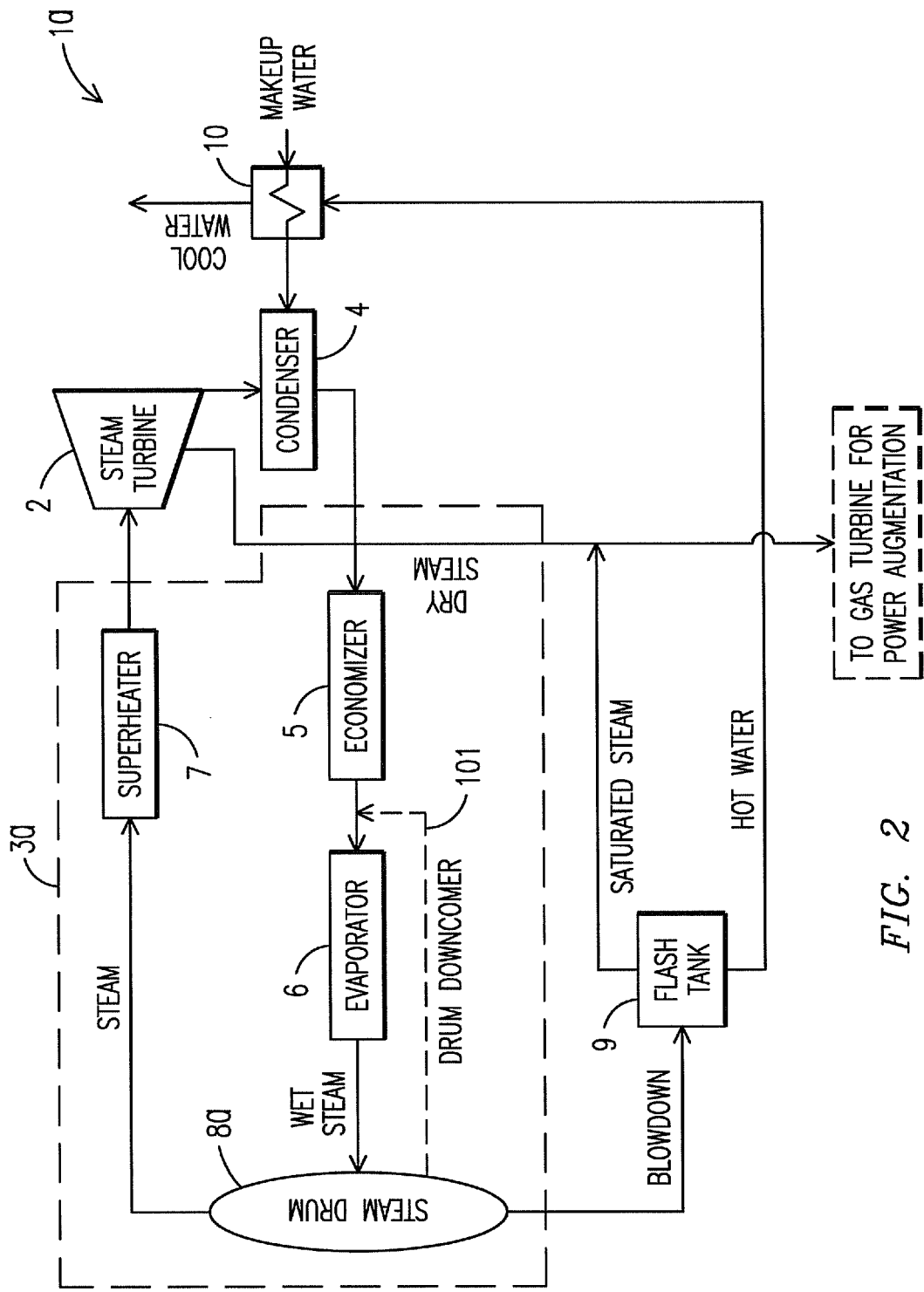
FIG. 2 is a simplified schematic diagram which illustrates the steam turbine system of a combined cycle power generation system according to another embodiment of the invention.

With reference to FIG. 2, there is shown in simplified schematic form a steam turbine system 1a according to another embodiment of the invention. As describe with respect to FIG. 1, the system 1a is part of a combined cycle power generation system such as shown in FIG. 3.

The system 1a includes a steam turbine 2 which receives superheated steam from a once-through HRSG 3a. Working fluid output from the turbine 2 is provided to a condenser 4 and is then recycled into the HRSG 3a. It is to be recognized that a HRSG design for a combined cycle system will normally have multiple stages but, for simplicity of illustration, the illustrated components of the HRSG 3a are the economizer 5, which is coupled to receive water from the condenser 4, an evaporator 6, which transitions the water into steam, a superheater 7, which converts saturated steam received from the evaporator into dry steam for injection into the steam turbine 2, a steam drum 8a, positioned in line between the evaporator 6 and the superheater 7, and a flash tank 9 coupled to receive water from the steam bottle.

The steam drum 8a functions as a moisture separation stage prior to entry of steam into the superheater 7. With the HRSG 3a comprising a steam drum, the steam entering the drum is wet, generally more than 60% liquid. In the moisture separation process a substantial portion of impurities present in the steam entering the drum 8a, e.g., introduced via make-up water, is entrained with the liquid in the drum. A portion of that liquid (i.e., the blowdown) is carried from the drum 8a to the flash tank 9. A feature of the invention is that the portion of the blowdown (e.g., about 20 percent), which is converted into steam in the flash tank 9, is used for power augmentation. The remainder of the liquid in the steam drum 8a may be recycled through drum downcomer 101 to the evaporator 6.

With regard to the embodiments of FIGS. 1 and 2, the flash tank 9 operates at a somewhat lower pressure than the superheater but at a sufficiently high pressure to effect injection into the combustion chamber of a gas turbine for power augmentation in the combined cycle system. Saturated steam from the flash tank 9 is merged with dry steam from the turbine 2 for diversion to a gas turbine for power augmentation. The hot water remaining in the flash tank 9 is sent to a heat exchanger 10 in order to transfer sensible heat to the make-up water prior to injection of the make-up water into the condenser 4. Relatively cool water, resulting from movement of hot water from the flash tank through the heat exchanger 10, is output from the heat exchanger 10 to a recovery tank (not shown). It may then be purified and used as the make-up water which is cycled through the heat exchanger 10 prior to input to the condenser 4.

In accord with the embodiment of FIG. 1, a HRSG includes a moisture separator positioned to separate the moisture (liquid fraction, blowdown) from relatively high pressure saturated steam heated in the HRSG, and outputs the moisture to a flash tank for generation of steam at a lower pressure. The steam is selectively passed from the flash tank to the combustion chamber of the gas turbine in order to provide power augmentation on demand. A remaining second portion of the blowdown from the steam bottle 8 is output from the flash tank 9 as relatively hot water. A water tank receives relatively cool replenishing water for input to the steam turbine system to compensate for a deficiency in working fluid resulting from diversion of steam to the combustion chamber for power augmentation. A heat exchanger is coupled to receive hot water from the flash tank and use the sensible heat in that hot water to heat the relatively cool replenishing water. The heat exchanger is coupled to provide the heated replenishing water to one of the steam turbines, e.g., via a condenser and the HRSG.

FIG. 3 illustrates a combined cycle system 11 in accord with an embodiment of the invention that is formed with a combustion turbine system 12, a high pressure steam turbine 14, an intermediate pressure steam turbine 16, a low pressure steam turbine 18, a Heat Recovery Steam Generator (HRSG) 20 (shown with phantom lines), and a condenser (COND) 22 coupled to receive working fluid from the low pressure steam turbine 18. The combustion turbine system 12 comprises an air compressor section 24, a combustion chamber 26 and a gas turbine 28 which are shown schematically. Other conventional components and fluid flow lines are omitted for clarity. For example, it is to be understood that a fluid flow line connects the exhaust output of the turbine 28 to an input at the high temperature side of the HSRG 20. Generally a combined cycle system in accord with the invention may comprise multiple low, intermediate and high pressure steam turbines, multiple gas turbines and multiple HRSGs.

Exhaust from the combustion turbine 28 is sent through the HRSG 20 after which it is vented (not shown). The HRSG 20 includes low, intermediate and high pressure stages which are shown schematically. The low pressure stage comprises an economizer 42, a low pressure drum 30, a low pressure evaporator 121 and a low pressure superheater 123. The economizer 42 heats water 30 derived from steam exiting the low pressure steam turbine 18 and which flows from the condenser 22 in liquid form. The economizer 42 produces hot water 50 close to the boiling point in the low pressure stage, a portion of which is provided to the low pressure drum 30 for recirculation in the evaporator 121 to make steam 51 which passes through the drum 30, through the low pressure superheater 123, and through the turbine 18. A portion of the hot water 50 output from the economizer 42 is input to the intermediate pressure stage of the HRSG 20, which comprises a second economizer 44, an intermediate pressure steam drum 32, an intermediate pressure evaporator 125 and a superheater 130. The water 50 input to the intermediate pressure stage circulates through the second economizer 44 where it is heated to nearly the saturation temperature of the IP stage, then passed into the intermediate pressure steam drum 32 and then through the intermediate pressure evaporator 125 to generate intermediate pressure steam 52. Steam exiting the drum 32 is saturated. Intermediate pressure steam 52 from the intermediate pressure drum 32 passes through the intermediate pressure superheater 130 (which forms the high temperature heating component of the intermediate stage of the HRSG 20) to further elevate the temperature of the working fluid prior to entry into the intermediate pressure steam turbine 16.

The majority of the hot water 50 output from the economizer 42 is input to the high pressure stage of the HRSG 20, which comprises a third economizer 48, a high pressure steam drum 34, a high pressure evaporator 127 and a high pressure superheater 132. Initially, the hot water 50 circulates through the third economizer 48 and then passes into the high pressure steam drum 34. From the high pressure steam drum 34 the water flows into the high pressure evaporator 127 to generate high pressure steam 54.

In the example embodiment of FIG. 3 the high pressure steam 54 generated by the high pressure evaporator 127 is saturated. The high pressure evaporator is coupled to the high pressure steam drum 34 which is coupled to the high pressure superheater 132 which forms the high temperature heating component of the high pressure stage of the HRSG 20. The high pressure steam 54 passes through the high pressure drum 34 and the high pressure superheater 132 to further elevate the temperature of the working fluid which is then supplied to the high pressure steam turbine 14.

Although details of such are not shown in the figures, the illustrated HRSG 20 may include flow paths for multi-pressure circuits each comprising an economizer, an evaporator and a superheater.

Each of the intermediate and high pressure drums 32 and 34 includes a flow line connected directly into the combustion chamber 26. A high pressure saturated steam flow line 60 carries high pressure saturated steam 54 from the drum 34 to the combustion chamber 26. Flow through the line 60 and into the combustion chamber 26 is controlled by a valve 64. The flow line 60 also includes a condenser 66. An intermediate pressure super heated steam flow line 70 carries intermediate pressure saturated steam 52 from the drum 32 to the combustion chamber 26. Flow through the line 70 and into the combustion chamber 26 is controlled by a valve 74. The flow line 70 also includes a condenser 76.

During start-up of the system 11, as soon as super heated steam 54 or 52 of sufficient pressure is generated from each of the high and intermediate pressure stages of the HRSG 20, the corresponding and respective valve 64 or 74 is opened to permit flow of the superheated steam into the combustion chamber 26. A first feature of the process is that almost immediately upon generation of the superheated steam 54 or 52, the majority of the carbon dioxide previously dissolved in the feedwater is volatized and mixed with the steam. Thus the amount of steam injection needed to remove a substantial portion of the carbon dioxide present in the working fluid is relatively small. Consequently the thermal loss associated with removal of carbon dioxide is also relatively small. Losses of purified water are further reduced with inclusion of the condensers 66 and 76 which are of design similar to the vent condensers described in U.S. Pat. No. 7,306,653 incorporated herein by reference. Other details and features of the system 11 relative to system start-up, operation of the condensers 66 and 76 and removal of entrained gases are found in co-pending U.S. patent application Ser. No. 12/503,177 filed 15 Jul. 2009 and incorporated herein by reference.

According to this embodiment of the invention, prior to superheating the saturated steam generated in the evaporators 125 and 127, liquid (blowdown) separated from both intermediate pressure steam 52, in steam drum 32, and high pressure steam 54, in steam drum 34, is sent to a flash tank 9 via drain lines 140 and 142. With the drums 32 and 34 each serving as a moisture separation stage for steam prior to entry into a superheater 130 or 132, a substantial portion of impurities present in the steam entering the drums is entrained with blowdown carried from in the drums 32 and 34 to the flash tank 9. A feature of the invention is that, at the onset of a demand for power augmentation, a portion of the blowdown is converted into steam in the flash tank 9 and injected into the combustion chamber 26. The flash tank 9 operates at a somewhat lower pressure than the superheaters 130 and 132, but at a sufficiently high pressure to effect injection into the combustion chamber 26. Thus saturated steam from the flash tank 9 is merged with dry steam 52 (or steam 54) for input to the combustion chamber 26 during power augmentation.

Noting that lost steam, e.g., due to power augmentation, must be replaced, a tank 146, holding make-up water 150, is coupled to send the water 150 through a heat exchanger 10 to the condenser 22. Non-flashed liquid in the tank 9. i.e., hot water 152, is sent through heat exchanger 10 to transfer sensible heat to the make-up water 150 prior to flow of the make-up water into the condenser 22. Relatively cool water 154, resulting from movement of hot water 152 from the flash tank through the heat exchanger 10, is output from the heat exchanger 10 and collected in a recovery tank 158. The recovered water 154 is then processed through a purification stage 162 and recycled as make-up water 150 into the tank 146.

In accord with the embodiment of FIG. 3, HRSG 20 includes a moisture separator positioned to separate liquid from relatively high pressure saturated steam heated in the HRSG, and outputs a first portion of the liquid (blowdown) as steam, e.g., from a flash tank, at a lower pressure. This steam is selectively passed to the combustion chamber of the gas turbine to provide power augmentation on demand. A remaining second portion of the liquid, relatively hot water, is used to heat relatively cool replenishing water, i.e., make-up water, to compensate for a deficiency in working fluid resulting from diversion of steam to the combustion chamber during power augmentation. The heat exchanger 10 transfers sensible heat in the second portion of the hot water to the relatively cool replenishing water. The heat exchanger is coupled to provide the heated replenishing water to one or more of the steam turbines 14, 16, 18, e.g., via the condenser 22 and the HRSG 20.

Generally, by flashing moisture which has been separated from saturated steam, e.g., from steam 52 or 54 via a steam drum, a secondary source of steam is made available for input to a combustion turbine to effect power augmentation at the onset of peak power demands. Sensible heat in the remaining moisture that has been separated from the saturated steam can be transferred, via a heat exchange mechanism, to make-up water or other working fluid.

While various embodiments of the present invention have been shown and described herein, such embodiments are provided by way of example only. Numerous variations, changes and substitutions may be made without departing from the invention herein. Accordingly, it is intended that the invention be limited only by the spirit and scope of the appended claims.

The claimed invention is:

1. A power generation system comprising:
   a steam turbine;
   a HRSG comprising (i) an evaporator coupled to receive condensate from the steam turbine, and (ii) a superheater coupled to receive output from the evaporator, the HRSG configured to generate steam for the steam turbine with thermal energy received from a combustion turbine;
   a flash tank positioned to (i) receive water heated in the HRSG, (ii) output a first portion of the received water as steam, and (iii) output a second portion of the received water as water;
   a flow line connected to pass the steam from the flash tank to a combustion chamber in a combustion turbine in order to selectively provide power augmentation; a water tank for receiving relatively cool replenishing water for input to the steam turbine system and thereby compensate for a deficincey in working fluid resulting from diversion of steam to the combustion chamber for power augmentation; and a heat exchanger coupled to receive the hot water from the flash tank and configured to receive and heat the relatively cool replenishing water from the water tank with the relatively hot liquid output from the flash tank, wherein the heat exchanger is coupled to provide the heated replenishing water to the steam turbine.

2. The power generation system of claim 1, further including a heat exchanger coupled to recover heat from the water output from the flash tank.

3. The power generation system of claim 2, wherein the heat exchanger is coupled to provide heated replenishing water to the steam turbine.

4. The power generation system of claim 1, wherein the condensate received from the steam turbine is heated in the HRSG.

5. The power generation system of claim 1, wherein the flash tank is connected to provide the steam as input to a combustion chamber of the combustion turbine.

6. The power generation system of claim 1 wherein the HRSG further includes a steam bottle positioned between the evaporator and the superheater to function as a moisture separation stage that provides the water, which is received by the flash tank, when wet steam is output from the evaporator, and wherein the steam bottle is connected to transfer the water to the flash tank.

7. The power generation system of claim 1 wherein the HRSG further includes a steam drum positioned between the evaporator and the superheater to function as a moisture separation stage that provides the water, which is received by the flash tank, when wet steam is output from the evaporator, and wherein the steam bottle is connected to transfer the water to the flash tank.

8. The power generation system of claim 7 wherein the steam drum effects entrainment of impurities, present in steam received from the evaporator, in the water received by the flash tank so that a portion of the impurities is transferred to the flash tank.

9. A combined cycle power generation system comprising:
a steam turbine;
a combustion turbine including a compressor, a combustion chamber and a gas turbine;
a HRSG comprising (i) an evaporator coupled to receive condensate from the steam turbine, and (ii) a superheater coupled to receive output from the evaporator, the HRSG configured to generate steam for the steam turbine with thermal energy received from the combustion turbine;
a flash tank positioned to (i) receive water heated in the HRSG, (ii) output a first portion of the received water as steam input to the combustion chamber of the combustion turbine, and (iii) output a second portion of the water;
a flow line connected to pass the steam from the flash tank to the combustion chamber of the combustion turbine in order to selectively provide power augmentation;
a water tank for receiving relatively cool replenishing water for input to the steam turbine system and thereby compensate for a deficiency in working fluid resulting from diversion of steam to the combustion chamber for power augmentation; and
a heat exchanger coupled to receive the water output from the flash tank and configured to receive and heat the relatively cool replenishing water from the water tank with the water output from the flash tank, wherein the heat exchanger is coupled to provide the heated replenishing water to the steam turbine.

10. The system of claim 9 wherein the flash tank is formed as part of the HRSG.

11. A method of operating a combined cycle power generation system having a combustion turbine, a steam turbine system and a HRSG for transferring sensible heat from exhaust gases of the combustion turbine to the steam turbine system, comprising:
separating moisture from a first supply of saturated steam produced at a relatively high pressure in the HRSG to provide a source of water;
flashing a portion of the water in a flash tank to generate a second supply of steam at a lower pressure than the first supply of steam;
selectively providing the second supply of steam to a combustion chamber of the gas turbine to provide power augmentation in the combined cycle power generation system; providing an unflashed portion of the water from the flash tank, as relatively hot liquid, to a heat exchange device to transfer heat present in the water to relatively cool make-up water and inputting make-up water to the steam turbine system to compensate for a deficiency in working fluid resulting from diversion of steam to the combustion chamber for power augmentation.

12. The method of claim 11 wherein the steps of separating moisture and flashing water are effected by positioning a steam drum to receive wet steam from an evaporator in the HRSG, forming the water in the steam drum and passing a portion of the water to a flash tank where a portion of the water remains as a liquid.

13. The method of claim 12 wherein the portion of the water in the flash tank which remains liquid after flashing is output to a heat exchanger for heat recovery.

14. The method of claim 13 wherein the liquid output from the flash tank to the heat exchanger is used to transfer sensible heat to a water supply used to replenish the power generation system to compensate for steam sent to the combustion chamber for power augmentation.

15. The method of claim 11 wherein the steps of separating moisture and flashing water are effected by positioning a steam bottle between an evaporator and a superheater in the HRSG to function as a moisture separation stage that generates the water and passing a portion of the water to a flash tank where a portion of the water remains as a liquid.

16. The method of claim 15 wherein the portion of the water in the flash tank which remains liquid after flashing is output to a heat exchanger for heat recovery.

17. The method of claim 16 wherein the liquid output from the flash tank to the heat exchanger is used to transfer sensible heat to a water supply used to replenish the power generation system to compensate for steam sent to the combustion chamber for power augmentation.

18. The method of claim 11 wherein, with the second supply of steam passed to the combustion chamber to provide power augmentation, a portion of the water formed by separating moisture from the first supply of saturated steam is recycled through an evaporator in the HRSG.

\* \* \* \* \*